United States Patent
Hwang et al.

(10) Patent No.: US 10,491,440 B2
(45) Date of Patent: Nov. 26, 2019

(54) METHOD FOR TRANSMITTING UPLINK CONTROL CHANNEL AND USER EQUIPMENT FOR PERFORMING SAME

(71) Applicant: LG Electronics Inc., Seoul (KR)

(72) Inventors: Daesung Hwang, Seoul (KR); Yunjung Yi, Seoul (KR); Hyunho Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/064,838

(22) PCT Filed: Feb. 2, 2017

(86) PCT No.: PCT/KR2017/001094
§ 371 (c)(1),
(2) Date: Nov. 8, 2018

(87) PCT Pub. No.: WO2017/135682
PCT Pub. Date: Aug. 10, 2017

(65) Prior Publication Data
US 2019/0068423 A1  Feb. 28, 2019

Related U.S. Application Data

(60) Provisional application No. 62/290,403, filed on Feb. 2, 2016.

(51) Int. Cl.
*H04L 12/28* (2006.01)
*H04L 27/26* (2006.01)
(Continued)

(52) U.S. Cl.
CPC ............ *H04L 27/2613* (2013.01); *H04L 5/00* (2013.01); *H04L 5/001* (2013.01); *H04L 5/0041* (2013.01);
(Continued)

(58) Field of Classification Search
CPC . H04L 5/0041; H04L 5/0053; H04L 27/2613; H04W 72/0413
(Continued)

(56) References Cited

U.S. PATENT DOCUMENTS 8,611,238 B2   12/2013  Papasakellariou
9,131,498 B2   9/2015   Au
(Continued)

FOREIGN PATENT DOCUMENTS

KR  1020110120498  11/2011
KR  1020120093912   8/2012
(Continued)

OTHER PUBLICATIONS

"3rd Generation Partnership Project; Technical Specification Group Radio Access Network; Evolved Universal Terrestrial Radio Access (E-UTRA); Physical Channels and Modulation (Release 10)," 3GPP TS 36.211, V10.4.0, Dec. 2011, 101 pages.
(Continued)

*Primary Examiner* — John Pezzlo
(74) *Attorney, Agent, or Firm* — Fish & Richardson P.C.

(57) ABSTRACT

A disclosure of the present specification provides a method for transmitting an uplink control channel by a user equipment (UE). The method may comprise the steps of: determining first uplink control information and second uplink control information different from the first uplink control information; determining the size of a first transmission time interval (TTI) for transmitting a first uplink control channel, on the basis of the size of the first uplink control information; determining the size of a second TTI for transmitting a second uplink control channel, on the basis of the size of the second uplink control information; transmitting the first uplink control channel including the first uplink control information according to the size of the first TTI; and
(Continued)

transmitting the second uplink control channel including the second uplink control information according to the size of the second TTI.

14 Claims, 11 Drawing Sheets

(51) Int. Cl.
*H04L 5/00* (2006.01)
*H04W 72/04* (2009.01)
*H04J 1/16* (2006.01)

(52) U.S. Cl.
CPC ....... *H04L 5/0053* (2013.01); *H04W 72/0413* (2013.01)

(58) Field of Classification Search
USPC .................................. 370/252, 329, 430, 386
See application file for complete search history.

(56) References Cited

U.S. PATENT DOCUMENTS

| 2011/0243066 A1* | 10/2011 | Nayeb Nazar | H04L 1/007 370/328 |
| 2014/0056237 A1 | 2/2014 | Eriksson | |
| 2014/0342746 A1 | 11/2014 | Nakashima et al. | |
| 2015/0036618 A1 | 2/2015 | Xu | |
| 2016/0295561 A1 | 10/2016 | Papasakellariou | |
| 2017/0223695 A1* | 8/2017 | Kwak | H04W 56/0075 |
| 2018/0110041 A1 | 4/2018 | Bendlin et al. | |
| 2018/0242286 A1 | 8/2018 | Song et al. | |
| 2018/0270722 A1* | 9/2018 | Kim | H04W 72/10 |
| 2019/0036746 A1* | 1/2019 | Hwang | H04L 5/00 |
| 2019/0081722 A1 | 3/2019 | Takeda et al. | |

FOREIGN PATENT DOCUMENTS

| KR | 1020130029374 | 3/2013 |
| KR | 1020130058589 | 6/2013 |
| KR | 1020140044393 | 4/2014 |
| WO | WO2013027967 A1 | 2/2013 |

OTHER PUBLICATIONS

United States Office Action in U.S. Appl. No. 16/259,580, dated Mar. 28, 2019, 15 pages.

* cited by examiner

METHOD FOR TRANSMITTING UPLINK CONTROL CHANNEL AND USER EQUIPMENT FOR PERFORMING SAME

CROSS-REFERENCE TO RELATED APPLICATIONS

This application is a National Stage application under 35 U.S.C. § 371 of International Application No. PCT/KR2017/001094, filed on Feb. 2, 2017, which claims the benefit of U.S. Provisional Application No. 62/290,403, filed on Feb. 2, 2016. The disclosures of the prior applications are incorporated by reference in their entirety.

BACKGROUND OF THE INVENTION

Field of the Invention

The present invention relates to mobile communication.

Related Art

3GPP (3rd Generation Partnership Project) LTE (Long Term Evolution) that is an advancement of UMTS (Universal Mobile Telecommunication System) is being introduced with 3GPP release 8. In 3GPP LTE, OFDMA (orthogonal frequency division multiple access) is used for downlink, and SC-FDMA (single carrier-frequency division multiple access) is used for uplink.

Such LTE may be generally divided into a frequency division duplex (FDD) type and a time division duplex (TDD) type.

As set forth in 3GPP TS 36.211 V10.4.0, the physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

Meanwhile, in a next generation mobile communication system, it is considered to set a transmission time interval (TTI) for specific or all physical channels in various manners to satisfy a requirement of various application fields. For example, in order to reduce a latency of communication performed between a base station and a terminal, a TTI used for transmission of a physical channel such as PDSCH, PUSCH, or PUCCH may be set to be smaller than 1 millisecond (msec). In addition, the TTI may be different for each of a plurality of physical channels existing in one subframe.

However, if the TTI for transmitting the physical channel is shortened, it is necessary to restrict an amount of data that can be transmitted/received by the terminal by using the shortened TTI. Therefore, methods for transmitting more data are required when the physical channel is transmitted using the shortened TTI.

SUMMARY OF THE INVENTION

Accordingly, a disclosure of the present specification has been made in an effort to solve the aforementioned problem.

In order to achieve the aforementioned purpose, a disclosure of the present specification provides a method of transmitting an uplink control channel by a user equipment (UE). The method may include: determining first uplink control information and second uplink control information different from the first uplink control information; determining a size of a first transmission time interval (TTI) for transmitting a first uplink control channel on the basis of a size of the first uplink control information; determining a size of a second TTI for transmitting a second uplink control channel on the basis of a size of the second uplink control information; transmitting the first uplink control channel including the first uplink control information on the basis of the size of the first TTI; and transmitting the second uplink control channel including the second uplink control information on the basis of the size of the second TTI. The size of the first TTI and the size of the second TTI may be different from each other.

In the determining of the size of the first TTI, the size of the first TTI for transmitting the first uplink control channel may be determined based on a type of the first uplink control information together with the size of the first uplink control information.

In the determining of the size of the first TTI, a size of a first resource block for transmitting the first uplink control channel may be determined based on the size of the first uplink control information. In the transmitting of the first uplink control channel, the first uplink control channel may be transmitted based on the size of the first TTI and the size of the first resource block.

The determining of the size of the first TTI may include: receiving information on a first group indicating sizes of a plurality of TTIs; and selecting the size of the first TTI corresponding to the size of the first uplink control information among the sizes of the plurality of TTIs indicated by the first group.

In the determining of the size of the first TTI, if the first uplink control information and third uplink control information are transmitted through the first uplink control channel, a size of a third TTI may be determined based on a size of the third uplink control information. In the transmitting of the first uplink control channel, the first uplink control information may be transmitted based on the size of the first TTI, and the third uplink control information is transmitted based on the size of the third TTI.

If a location on a time domain of a resource for transmitting the first uplink control information and a location on a time domain of a resource for transmitting the third uplink control information are less than or equal to a predetermined interval, the size of the third TTI may be equal to the size of the first TTI regardless of the size of the third uplink control information.

At least one of the size of the first TTI and the size of the second TTI may be less than 1 millisecond.

In order to achieve the aforementioned purpose, another disclosure of the present specification provides a wireless device for transmitting an uplink control channel. The wireless device may include: a radio frequency (RF) unit transmitting/receiving a radio signal; and a processor controlling the RF unit. The processor may be configured to: determine first uplink control information and second uplink control information different from the first uplink control information; determine a size of a first TTI for transmitting a first uplink control channel on the basis of a size of the first uplink control information; determine a size of a second TTI for transmitting a second uplink control channel on the basis of a size of the second uplink control information; control the RF unit to transmit the first uplink control channel including the first uplink control information on the basis of the size of the first TTI; and control the RF unit to transmit the second uplink control channel including the second uplink control information on the basis of the size of the second TTI.

According to a disclosure of the present specification, a resource can be more efficiently allocated when a physical channel is transmitted using a shortened or extended TTI.

DESCRIPTION OF EXEMPLARY EMBODIMENTS

Figure 1:
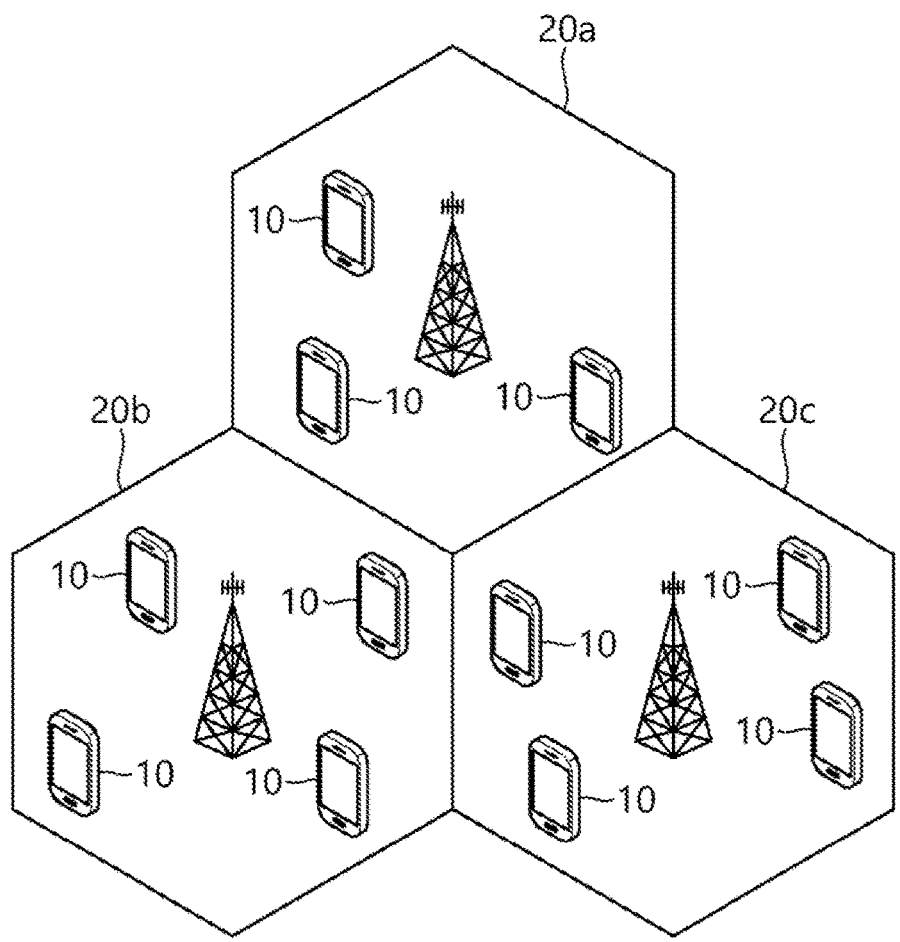
FIG. 1 shows a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the specification includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the specification, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, user equipment (UE) may be stationary or mobile, and may be denoted by other terms such as device, wireless device, terminal, MS (mobile station), UT (user terminal), SS (subscriber station), MT (mobile terminal) and etc.

FIG. 1 shows a wireless communication system.

Referring to FIG. 1, the wireless communication system includes at least one base station (BS) 20. Respective BSs 20 provide a communication service to particular geographical areas 20a, 20b, and 20c (which are generally called cells).

The UE generally belongs to one cell and the cell to which the terminal belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the terminal 10 and an uplink means communication from the terminal 10 to the base station 20. In the downlink, a transmitter may be a part of the base station 20 and a receiver may be a part of the terminal 10. In the uplink, the transmitter may be a part of the terminal 10 and the receiver may be a part of the base station 20.

Meanwhile, the wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmit antennas and a plurality of receive antennas. The MISO system uses a plurality of transmit antennas and one receive antenna. The SISO system uses one transmit antenna and one receive antenna. The SIMO system uses one transmit antenna and one receive antenna. Hereinafter, the transmit antenna means a physical or logical antenna used to transmit one signal or stream and the receive antenna means a physical or logical antenna used to receive one signal or stream.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
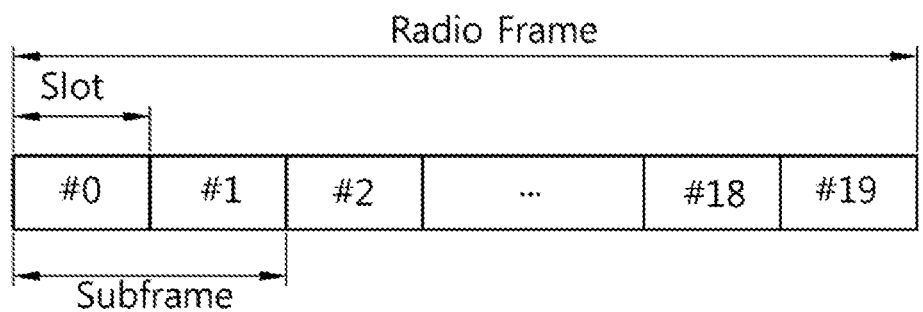
FIG. 2 shows a downlink radio frame structure according to FDD of 3rd generation partnership project (3GPP) long term evolution (LTE).

FIG. 2 shows a downlink radio frame structure according to FDD of 3rd generation partnership project (3GPP) long term evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

Referring to FIG. 2, the radio frame consists of 10 subframes. One subframe consists of two slots. Slots included in the radio frame are numbered with slot numbers 0 to 19. A time required to transmit one subframe is defined as a transmission time interval (TTI). The TTI may be a scheduling unit for data transmission. For example, one radio frame may have a length of 10 milliseconds (ms), one subframe may have a length of 1 ms, and one slot may have a length of 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
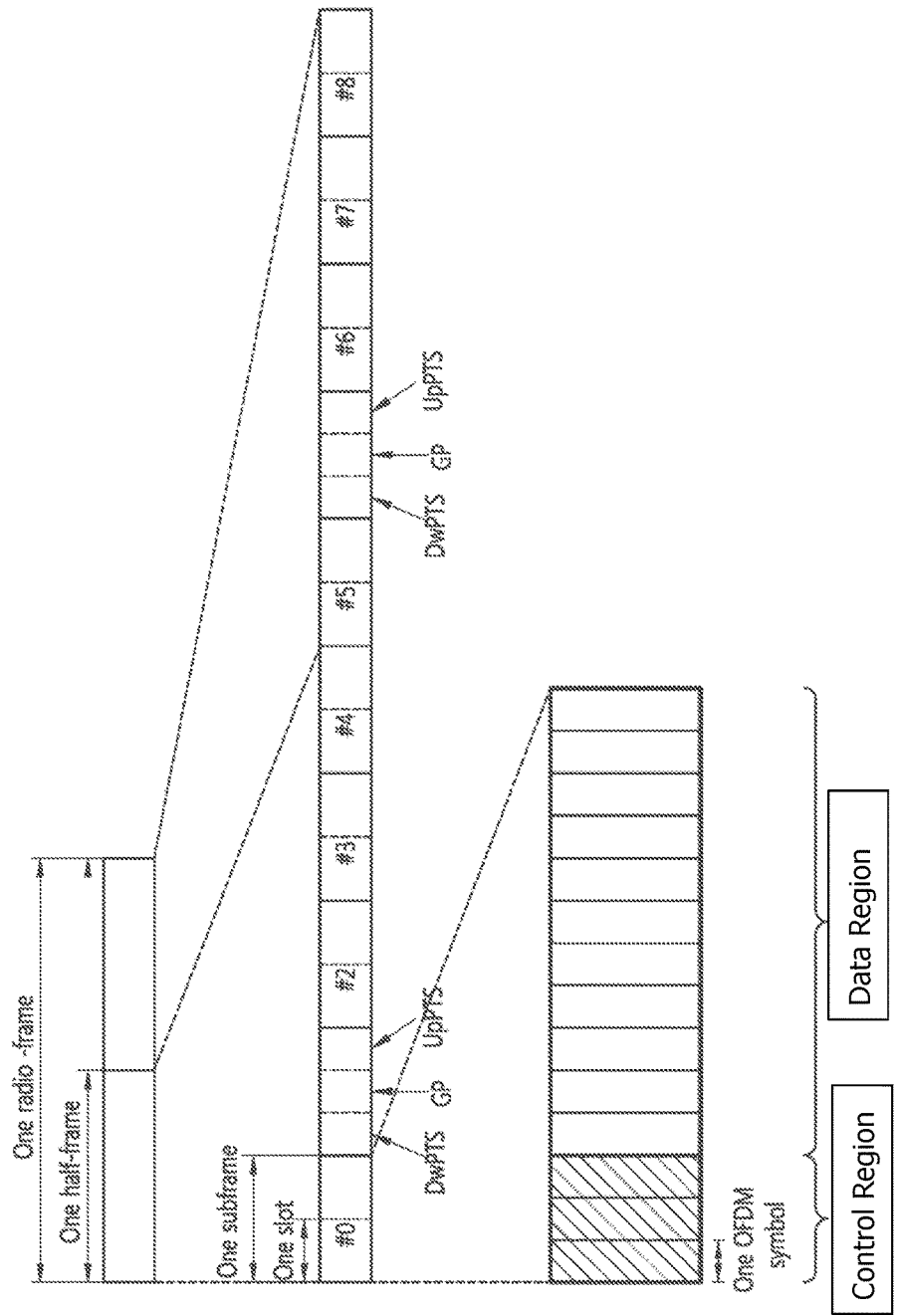
FIG. 3 illustrates the architecture of a downlink radio frame according to TDD of 3GPP LTE.

FIG. 3 illustrates the architecture of a downlink radio frame according to TDD of 3GPP LTE.

For this, 3GPP TS 36.211 V10.4.0 (2011-12) "Evolved Universal Terrestrial Radio Access (E-UTRA); Physical Channels and Modulation (Release 8)", Ch. 4 may be referenced, and this is for TDD (time division duplex).

The radio frame includes 10 sub-frames indexed 0 to 9. One sub-frame includes two consecutive slots. The time for one sub-frame to be transmitted is denoted TTI (transmission time interval). For example, the length of one sub-frame may be 1 ms, and the length of one slot may be 0.5 ms.

One slot may include a plurality of OFDM (orthogonal frequency division multiplexing) symbols in the time domain. The OFDM symbol is merely to represent one symbol period in the time domain since 3GPP LTE adopts OFDMA (orthogonal frequency division multiple access) for downlink (DL), and thus, the multiple access scheme or name is not limited thereto. For example, OFDM symbol may be denoted by other terms such as SC-FDMA (single carrier-frequency division multiple access) symbol or symbol period.

By way of example, one slot includes seven OFDM symbols. However, the number of OFDM symbols included in one slot may vary depending on the length of CP (cyclic prefix). In the normal CP, includes seven OFDM symbols, and in the extended CP, includes six OFDM symbols.

Resource block (RB) is a resource allocation unit and includes a plurality of sub-carriers in one slot. For example, if one slot includes seven OFDM symbols in the time domain and the resource block includes 12 sub-carriers in the frequency domain, one resource block may include 7×12 resource elements (REs).

Sub-frames having index #1 and index #6 are denoted special sub-frames, and include a DwPTS (Downlink Pilot Time Slot: DwPTS), a GP (Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) sub-frame and a UL (Uplink) co-exist in one radio frame. Table 1 shows an example of configuration of a radio frame.

TABLE 1

| UL-DL Configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL sub-frame,
'U' a UL sub-frame, and
'S' a special sub-frame.

'D' denotes a DL sub-frame, 'U' a UL sub-frame, and 'S' a special sub-frame. When receiving a UL-DL configuration from the base station, the terminal may be aware of whether a sub-frame is a DL sub-frame or a UL sub-frame according to the configuration of the radio frame.

The DL (downlink) sub-frame is split into a control region and a data domain in the time domain. The control region includes up to three first OFDM symbols in the first slot of the sub-frame. However, the number of OFDM symbols included in the control region may be changed. A PDCCH and other control channels are assigned to the control region, and a PDSCH is assigned to the data domain.

Figure 4:
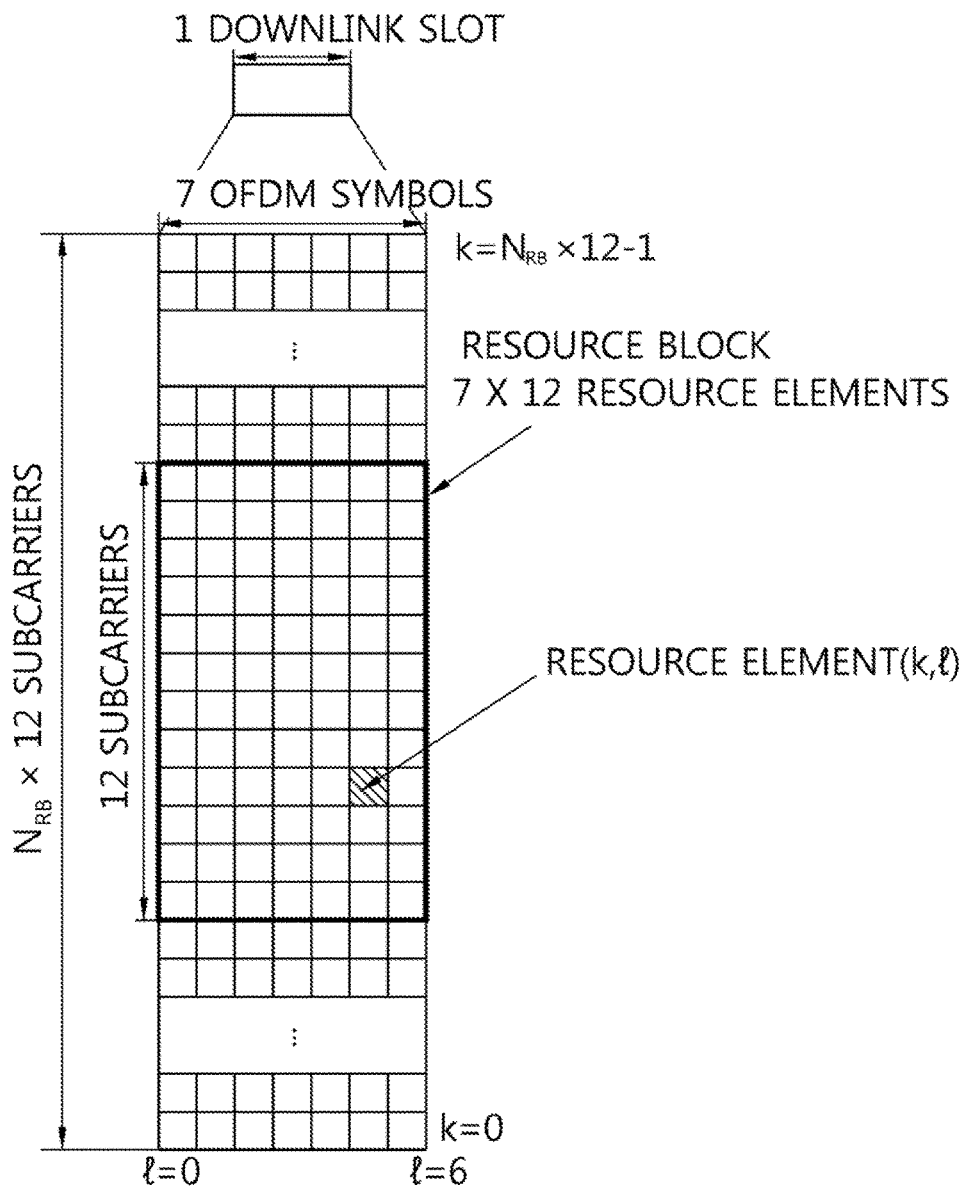
FIG. 4 illustrates an example resource grid for one uplink or downlink slot in 3GPP LTE.

FIG. 4 illustrates an example resource grid for one uplink or downlink slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

Here, by way of example, one resource block includes 7×12 resource elements that consist of seven OFDM symbols in the time domain and 12 sub-carriers in the frequency domain. However, the number of sub-carriers in the resource block and the number of OFDM symbols are not limited thereto. The number of OFDM symbols in the resource block or the number of sub-carriers may be changed variously. In other words, the number of OFDM symbols may be varied depending on the above-described length of CP. In particular, 3GPP LTE defines one slot as having seven OFDM symbols in the case of CP and six OFDM symbols in the case of extended CP.

OFDM symbol is to represent one symbol period, and depending on system, may also be denoted SC-FDMA symbol, OFDM symbol, or symbol period. The resource block is a unit of resource allocation and includes a plurality of sub-carriers in the frequency domain. The number of resource blocks included in the uplink slot, i.e., NUL, is dependent upon an uplink transmission bandwidth set in a cell. Each element on the resource grid is denoted resource element.

Meanwhile, the number of sub-carriers in one OFDM symbol may be one of 128, 256, 512, 1024, 1536, and 2048.

In 3GPP LTE, the resource grid for one uplink slot shown in FIG. 4 may also apply to the resource grid for the downlink slot.

Figure 5:
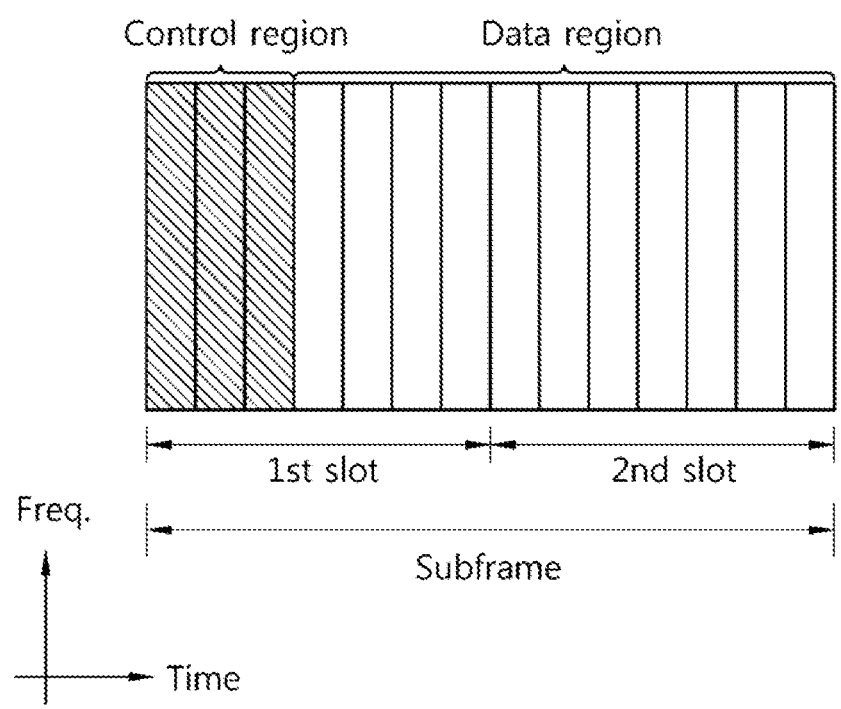
FIG. 5 illustrates the architecture of a downlink sub-frame.

FIG. 5 illustrates the architecture of a downlink sub-frame.

In FIG. 5, assuming the normal CP, one slot includes seven OFDM symbols, by way of example. However, the number of OFDM symbols included in one slot may vary depending on the length of CP (cyclic prefix). That is, as described above, according to 3GPP TS 36.211 V10.4.0, one slot includes seven OFDM symbols in the normal CP and six OFDM symbols in the extended CP.

The DL (downlink) sub-frame is split into a control region and a data domain in the time domain. The control region includes up to first three OFDM symbols in the first slot of the sub-frame. However, the number of OFDM symbols included in the control region may be changed. A PDCCH (physical downlink control channel) and other control channels are assigned to the control region, and a PDSCH is assigned to the data domain.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the sub-frame carries CIF (control format indicator) regarding the number (i.e., size of the control region) of OFDM symbols used for transmission of control channels in the sub-frame. The wireless device first receives the CIF on the PCFICH and then monitors the PDCCH.

Unlike the PDCCH, the PCFICH is transmitted through a fixed PCFICH resource in the sub-frame without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is sent on the PHICH.

The PBCH (physical broadcast channel) is transmitted in the first four OFDM symbols in the second slot of the first sub-frame of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an higher layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be sent in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be sent to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be sent to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Mode 1 | DCI format 1A | Common and UE-specific | Single antenna port, port 0 |
|  | DCI format 1 | UE-specific | Single antenna port, port 0 |
| Mode 2 | DCI format 1A | Common and UE-specific | Transmission diversity |
|  | DCI format 1 | UE-specific | Transmission diversity |
| Mode 3 | DCI format 1A | Common and UE-specific | Transmission diversity |
|  | DCI format 2A | UE-specific | CDD (Cyclic Delay Diversity) or Transmission diversity |
| Mode 4 | DCI format 1A | Common and UE-specific | Transmission diversity |
|  | DCI format 2 | UE-specific | Closed-loop spatial multiplexing |
| Mode 5 | DCI format 1A | Common and UE-specific | Transmission diversity |
|  | DCI format 1D | UE-specific | MU-MIMO(Multi-user Multiple Input Multiple Output) |
| Mode 6 | DCI format 1A | Common and UE-specific | Transmission diversity |
|  | DCI format 1B | UE-specific | Closed-loop spatial multiplexing |
| Mode 7 | DCI format 1A | Common and UE-specific | Single antenna port, port 0 if the number of PBCH transmission port is 1, otherwise Transmission diversity |
|  | DCI format 1 | UE-specific | Single antenna port, port 5 |
| Mode 8 | DCI format 1A | Common and UE-specific | Single antenna port, port 0 if the number of PBCH transmission port is 1, otherwise Transmission diversity |
|  | DCI format 2B | UE-specific | Dual layer transmission (port 7 or 8), or single antenna port, port 7 or 8 |
| Mode 9 | DCI format 1A | Common and UE-specific | Non-MBSFN subframe: If the number of PBCH antenna ports is 1, then port 0 is used as the sole antenna port; otherwise, the transmit diversity is used. MBSFN subframe: single antenna port, port 7 |
|  | DCI format 2C | UE-specific | Up to eight transport layers, ports 7-14 are used, or port 7 or port 8 is used as the sole antenna port |
| Mode 10 | DCI format 1A | Common and UE-specific | Non-MBSFN subframe: If the number of PBCH antenna ports is 1, then port 0 is used as the sole antenna port; otherwise, the transmit diversity is used. MBSFN subframe: single antenna port, port 7 |
|  | DCI format 2D | UE-specific | Up to eight transport layers, ports 7-14 are used, or port 7 or port 8 is used as the sole antenna port |

The use of the DCI format is divided into the following table.

TABLE 3

| DCI format | Contents |
|---|---|
| DCI format 0 | Used for PUSCH scheduling |
| DCI format 1 | Used for scheduling one PDSCH codeword |
| DCI format 1A | Used for compact scheduling of one PDSCH codeword and random access procedure |
| DCI format 1B | Used for compact scheduling of one PDSCH codeword including precoding information |
| DCI format 1C | Used for very compact scheduling of one PDSCH codeword |
| DCI format 1D | Used for precoding and compact scheduling of one PDSCH codeword including power offset information |
| DCI format 2 | Used for PDSCH scheduling UEs setup as closed-loop spatial multiplexing |
| DCI format 2A | Used for PDSCH scheduling UEs setup as open-loop spatial multiplexing |
| DCI format 3 | Used for transmitting PUCCH having 2 bit power adjustments and TPC command of PUSCH |
| DCI format 3A | Used for transmitting PUCCH having 1 bit power adjustments and TPC command of PUSCH |
| DCI format 4 | Used for PUSCH scheduling of uplink (UL) cells operating in multi-antenna port transmission mode |

The uplink channels include a PUSCH, a PUCCH, an SRS (Sounding Reference Signal), and a PRACH (physical random access channel).

Meanwhile, the PDCCH is monitored in an area restricted to the control region in the subframe, and a CRS transmitted in a full band is used to demodulate the PDCCH. As a type of control data is diversified and an amount of control data is increased, scheduling flexibility is decreased when using only the existing PDCCH. In addition, in order to decrease an overhead caused by CRS transmission, an enhanced PDCCH (EPDCCH) is introduced.

Figure 6:
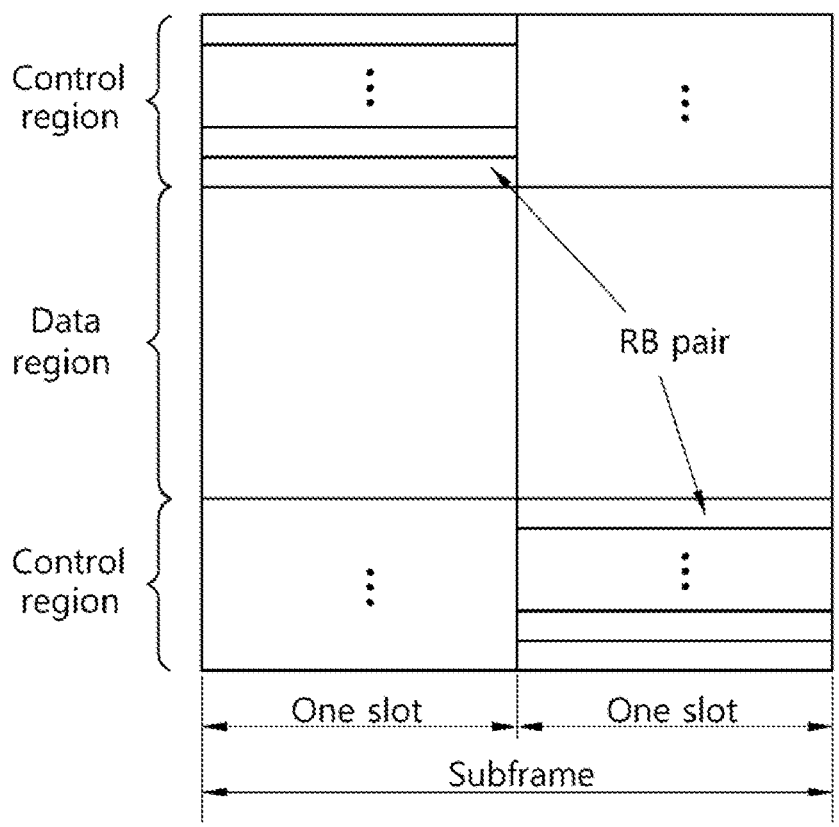
FIG. 6 illustrates the architecture of an uplink sub-frame in 3GPP LTE.

FIG. 6 illustrates the architecture of an uplink sub-frame in 3GPP LTE.

Referring to FIG. 6, the uplink sub-frame may be separated into a control region and a data domain in the frequency domain. The control region is assigned a PUCCH (physical uplink control channel) for transmission of uplink control information. The data domain is assigned a PUSCH (physical uplink shared channel) for transmission of data (in some cases, control information may also be transmitted).

The PUCCH for one terminal is assigned in resource block (RB) pair in the sub-frame. The resource blocks in the resource block pair take up different sub-carriers in each of the first and second slots. The frequency occupied by the resource blocks in the resource block pair assigned to the PUCCH is varied with respect to a slot boundary. This is referred to as the RB pair assigned to the PUCCH having been frequency-hopped at the slot boundary.

The terminal may obtain a frequency diversity gain by transmitting uplink control information through different sub-carriers over time. m is a location index that indicates a logical frequency domain location of a resource block pair assigned to the PUCCH in the sub-frame.

The uplink control information transmitted on the PUCCH includes an HARQ (hybrid automatic repeat request), an ACK (acknowledgement)/NACK (non-acknowledgement), a CQI (channel quality indicator) indicating a downlink channel state, and an SR (scheduling request) that is an uplink radio resource allocation request.

The PUSCH is mapped with a UL-SCH that is a transport channel. The uplink data transmitted on the PUSCH may be a transport block that is a data block for the UL-SCH transmitted for the TTI. The transport block may be user information. Or, the uplink data may be multiplexed data. The multiplexed data may be data obtained by multiplexing the transport block for the UL-SCH and control information.

<Carrier Aggregation (CA)>

A carrier aggregation system is now described.

Figure 7:
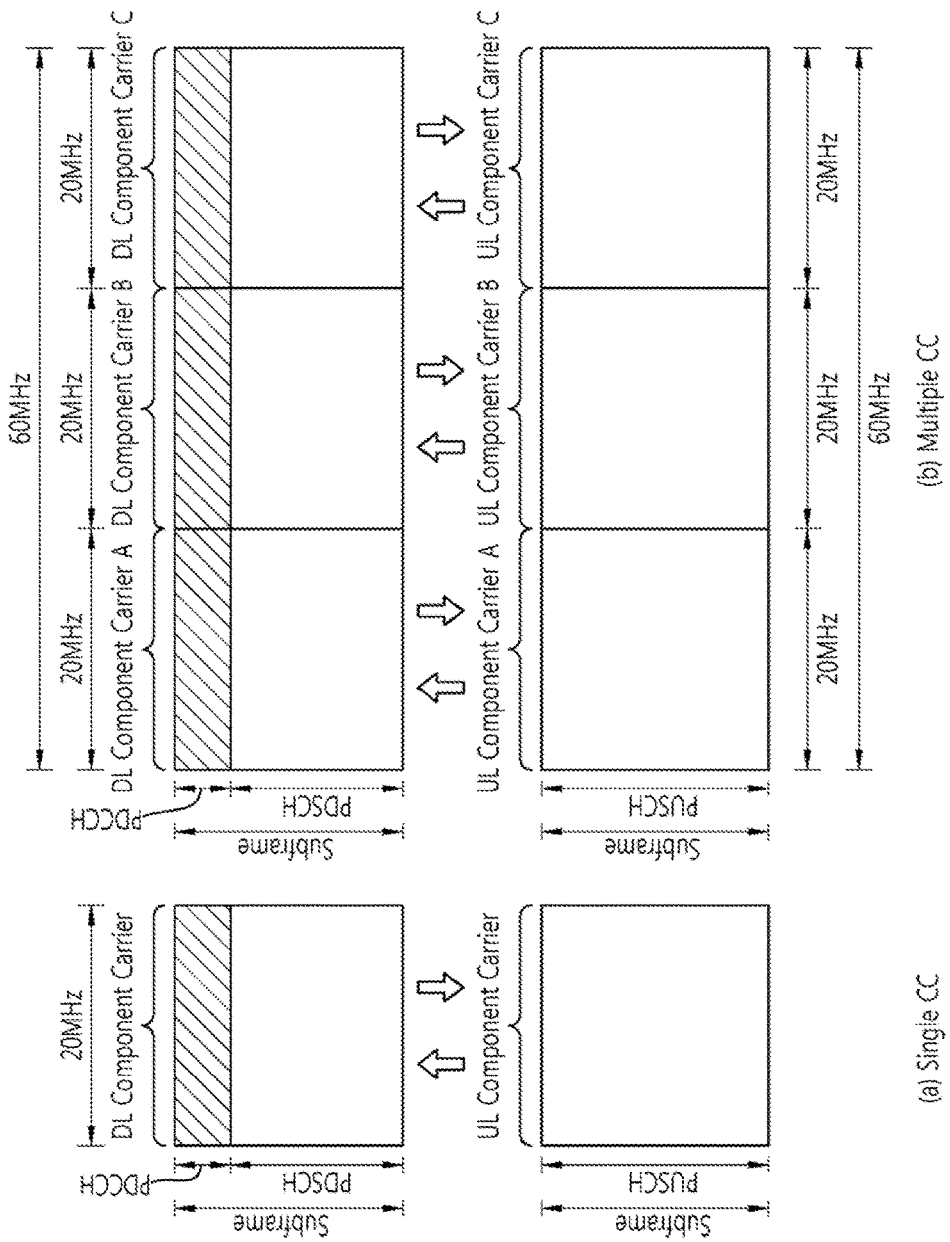
FIG. 7 illustrates an example of comparison between a single carrier system and a carrier aggregation system.

FIG. 7 illustrates an example of comparison between a single carrier system and a carrier aggregation system.

Referring to FIG. 7, there may be various carrier bandwidths, and one carrier is assigned to the terminal. On the contrary, in the carrier aggregation (CA) system, a plurality of component carriers (DL CC A to C, UL CC A to C) may be assigned to the terminal. Component carrier (CC) means the carrier used in then carrier aggregation system and may be briefly referred as carrier. For example, three 20 MHz component carriers may be assigned so as to allocate a 60 MHz bandwidth to the terminal.

Carrier aggregation systems may be classified into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both the case where the component carrier is contiguous and the case where the control channel is non-contiguous.

When one or more component carriers are aggregated, the component carriers may use the bandwidth adopted in the existing system for backward compatibility with the existing system. For example, the 3GPP LTE system supports bandwidths of 1.4 MHz, 3 MHz, 5 MHz, 10 MHz, 15 MHz and 20 MHz, and the 3GPP LTE-A system may configure a broad band of 20 MHz or more only using the bandwidths of the 3GPP LTE system. Or, rather than using the bandwidths of the existing system, new bandwidths may be defined to configure a wide band.

The system frequency band of a wireless communication system is separated into a plurality of carrier frequencies. Here, the carrier frequency means the cell frequency of a cell. Hereinafter, the cell may mean a downlink frequency resource and an uplink frequency resource. Or, the cell may refer to a combination of a downlink frequency resource and an optional uplink frequency resource. Further, in the general case where carrier aggregation (CA) is not in consideration, one cell may always have a pair of an uplink frequency resource and a downlink frequency resource.

In order for packet data to be transmitted/received through a specific cell, the terminal should first complete a configuration on the specific cell. Here, the configuration means that reception of system information necessary for data transmission/reception on a cell is complete. For example, the configuration may include an overall process of receiving common physical layer parameters or MAC (media access control) layers necessary for data transmission and reception or parameters necessary for a specific operation in the RRC layer. A configuration-complete cell is in the state where, once when receiving information indicating packet data may be transmitted, packet transmission and reception may be immediately possible.

The cell that is in the configuration complete state may be left in an activation or deactivation state. Here, the "activation" means that data transmission or reception is being conducted or is in ready state. The terminal may monitor or receive a control channel (PDCCH) and a data channel (PDSCH) of the activated cell in order to identify resources (possibly frequency or time) assigned thereto.

The "deactivation" means that transmission or reception of traffic data is impossible while measurement or transmission/reception of minimal information is possible. The terminal may receive system information (SI) necessary for receiving packets from the deactivated cell. In contrast, the terminal does not monitor or receive a control channel (PDCCH) and data channel (PDSCH) of the deactivated cell in order to identify resources (probably frequency or time) assigned thereto.

Cells may be classified into primary cells and secondary cells, serving cells.

The primary cell means a cell operating at a primary frequency. The primary cell is a cell where the terminal conducts an initial connection establishment procedure or connection re-establishment procedure with the base station or is a cell designated as a primary cell during the course of handover.

The secondary cell means a cell operating at a secondary frequency. The secondary cell is configured once an RRC connection is established and is used to provide an additional radio resource.

The serving cell is configured as a primary cell in case no carrier aggregation is configured or when the terminal cannot offer carrier aggregation. In case carrier aggregation is configured, the term "serving cell" denotes a cell configured to the terminal and a plurality of serving cells may be included. One serving cell may consist of one downlink component carrier or a pair of {downlink component carrier, uplink component carrier}. A plurality of serving cells may consist of a primary cell and one or more of all the secondary cells.

As described above, the carrier aggregation system, unlike the single carrier system, may support a plurality of component carriers (CCs), i.e., a plurality of serving cells.

Such carrier aggregation system may support cross-carrier scheduling. The cross-carrier scheduling is a scheduling scheme that may conduct resource allocation of a PUSCH transmitted through other component carriers than the component carrier basically linked to a specific component carrier and/or resource allocation of a PDSCH transmitted through other component carriers through a PDCCH transmitted through the specific component carrier. In other words, the PDCCH and the PDSCH may be transmitted through different downlink CCs, and the PUSCH may be transmitted through an uplink CC other than the uplink CC linked to the downlink CC where the PDCCH including a UL grant is transmitted. As such, the system supporting cross-carrier scheduling needs a carrier indicator indicating a DL CC/UL CC through which a PDSCH/PUSCH is transmitted where the PDCCH offers control information. The field including such carrier indicator is hereinafter denoted carrier indication field (CIF).

The carrier aggregation system supporting cross-carrier scheduling may contain a carrier indication field (CIF) in the conventional DCI (downlink control information) format. In the cross-carrier scheduling-supportive carrier aggregation system, for example, an LTE-A system, may have 3 bits expanded due to addition of the CIF to the existing DCI format (i.e., the DCI format used in the LTE system), and the PDCCH architecture may reuse the existing coding method or resource allocation method (i.e., CCE-based resource mapping).

Figure 8:
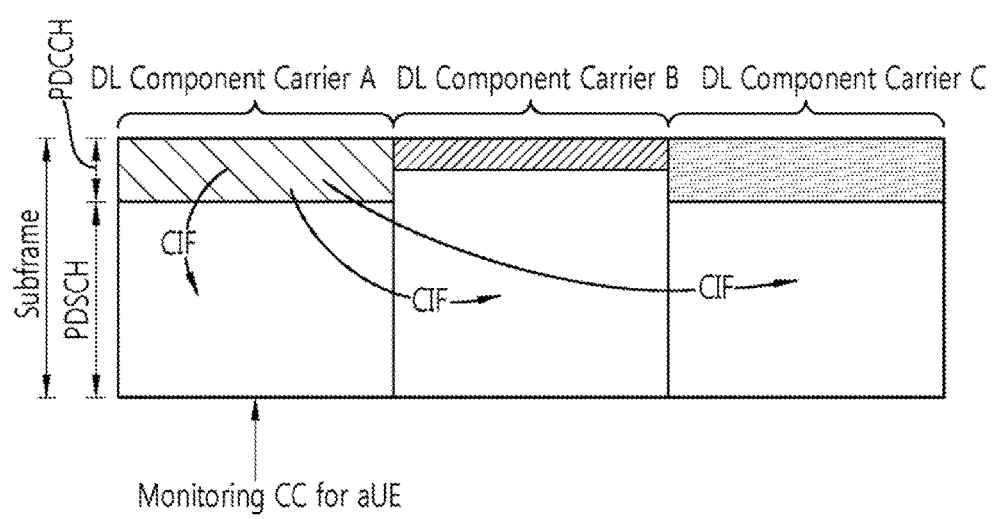
FIG. 8 exemplifies cross-carrier scheduling in the carrier aggregation system.

FIG. 8 exemplifies cross-carrier scheduling in the carrier aggregation system.

Referring to FIG. 8, the base station may configure a PDCCH monitoring DL CC (monitoring CC) set. The PDCCH monitoring DL CC set consists of some of all of the aggregated DL CCs, and if cross-carrier scheduling is configured, the user equipment performs PDCCH monitoring/decoding only on the DL CCs included in the PDCCH monitoring DL CC set. In other words, the base station transmits a PDCCH for PDSCH/PUSCH that is subject to scheduling only through the DL CCs included in the PDCCH monitoring DL CC set. The PDCCH monitoring DL CC set may be configured UE-specifically, UE group-specifically, or cell-specifically.

FIG. 8 illustrates an example in which three DL CCs (DL CC A, DL CC B, and DL CC C) are aggregated, and DL CC A is set as a PDCCH monitoring DL CC. The user equipment may receive a DL grant for the PDSCH of DL CC A, DL CC B, and DL CC C through the PDCCH of DL CC A. The DCI transmitted through the PDCCH of DL CC A contains a CIF so that it may indicate which DL CC the DCI is for.

<Disclosure of the Present Specification>

In a next generation mobile communication system, it is considered to set a transmission time interval (TTI) for specific or all physical channels in various manners to satisfy a requirement of various application fields. For example, in order to reduce a latency of communication performed between a BS and a UE, a TTI used for transmission of a physical channel such as PDSCH, PUSCH, or PUCCH may be set to be smaller than 1 millisecond (msec). In addition, the TTI may be different for each of a plurality of physical channels existing in one subframe.

However, if the TTI for transmitting the physical channel is shortened, it is necessary to restrict an amount of data that can be transmitted/received by the UE by using the shortened TTI. For example, when the UE transmits uplink control information (UCI), a TTI for transmitting a PUCCH is shortened, thereby restricting the number of resource elements (REs) per one resource block (RB). Therefore, there is a need to extend the RE to a frequency domain to transmit the UCI having a specific size. In particular, when the size of the UCI is great as in a case where channel state information (CSI) is included in the UCI, there is a growing need for extending the RE as described above.

Therefore, a disclosure of the present specification proposes a method of transmitting an uplink channel by using a plurality of resources and an effective resource allocation method, when a physical channel is transmitted by using a shortened or extended TTI.

In the following description, a normal subframe size (1 msec) is referred to as a normal TTI, and a TTI having a smaller size than the normal subframe size is referred to as a shortened TTI. The shortened TTI may be configured in unit of one or a plurality of OFDM or SC-FDMA symbols. In addition, although the following description is based on the shortened TTI, it is obvious that the same can be equally applied to a TTI (i.e., an extended TTI) greater than a normal subframe size.

1. PUCCH Resource Allocation Method Based on UCI Size

When a physical channel is transmitted using a shortened TTI, a size of the TTI may be selected or configured according to a requirement of an application field. More specifically, sizes of a plurality of TTIs may be configured and managed as a TTI size group. In this case, the TTI size group may be preferentially selected through implicit mapping or higher layer signaling on the basis of a specific transmission channel. For example, in case of considering TTIs having sizes of 2, 3, 4, and 7, the TTI size group may be configured in a form of {2, 3} and {4, 7}, and a BS may select any one of two groups according a situation or requirement of an application field and may report it to a UE. Unlike this, each of all shortened TTIs may belong to the TTI size group, and the TTI size group may be configured based on the size of the TTI to be used.

Since a UCI size may be various when a PUCCH is transmitted, the number of resource elements required for PUCCH transmission may also be various. Therefore, although the TTI size group may be predetermined or configured by higher layer signaling, a TTI size to be used in real PUCCH transmission may be selected based on the UCI size among TTI sizes belonging to the configured TTI size group. More particularly, a combination of the TTI size and a resource block size may be selected based on the UCI size. Specifically, the combination of the TTI size and the resource block size may be selected such that a code rate predetermined for UCI or a code rate configured by a higher layer for each UCI type is greater than or equal to a predetermined level. Alternatively, the combination of the TTI size and the resource block size may be selected according to a mapping relation of the combination of the TTI size and the resource block size, based on the UCI size determined by the higher layer.

Since the aforementioned PUCCH transmission method is only one embodiment, obviously, it may be extendedly applied to PUSCH or PUDSCH transmission. For example, it may be extendedly applied in such a manner that a TTI group size is configured for a PUSCH or a PDSCH through higher layer signaling or the like, and the TTI size to be used in real PUSCH or PDSCH transmission is selected according to a DCI indication.

In order to efficiently manage the TTI size and resource block size for PUCCH transmission in terms of multiplexing and resource utilization, a combination of a TTI size and a resource block size, which are configured semi-statically, may be maintained for a specific time instead of changing the combination of the TTI size and the resource block size on a real-time basis according to the UCI size. In this case, the combination of the TTI size and the resource block size may be set differently according to a UCI type or a UCI size.

In other words, higher layer signaling regarding a configuration for the combination of the TTI size and the resource block size or a configuration for each of the TTI size and the resource block size may exist independently for each of the UCI type or the UCI size. For example, the TTI size or resource block size for HARQ ACK or the TTI size or resource block size for CSI may be set independently.

Unlike this, it may be considered to configure a combination of a single TTI size and resource block size through higher layer signaling or the like for a PUCCH. In this case, the combination of the TTI size and the resource block size may be configured based on specific UCI (e.g., HARQ ACK or CSI or the like). For example, the combination of the TTI size and the resource block size may be configured based on HARQ ACK. In this case, the number of resource elements for transmitting periodic CSI may be insufficient. If the number of resource elements for transmitting the periodic CSI is insufficient, UCI including the periodic CSI may be transmitted in a divided manner through a plurality of TTIs or a plurality of PUCCHs transmitted in the resource block. More specifically, the UCI including the periodic CSI may be transmitted by being divided in a raw data stage. Alternatively, encoding may be performed on the UCI and thereafter coded symbols may be transmitted in a divided manner.

2. Coexistence of Combination of Multi-TTI Size and/or Resource Block Size

A TTI size may be set to be significantly small such as one or two symbols, according to a requirement of an application field. In this case, an excessively great resource block size may be required to transmit specific UCI. For example, the excessively large resource block size may be frequently required when periodic CSI is transmitted or a multi-HARQ ACK or a scheduling request is transmitted in a carrier aggregation situation. Basically, there is a need to secure time-frequency resources for transmitting PUCCH in advance regardless of whether transmission is performed in practice. Therefore, in this case, another transmission (e.g., PUSCH transmission) for a corresponding resource region may be restricted. In particular, when the PUCCH corresponds to periodic CSI transmission, it may be used only for a symbol restricted in a subframe according to a configuration. However, another transmission (e.g., PUSCH transmission) may still be restricted for a TTI including a corresponding subframe or a corresponding symbol domain.

In order to solve such a problem, it may be considered to restrict a time duration in which a shortened TTI is used and to report information on the time duration in which the shortened TTI is used to a UE through higher layer signaling. In this case, during the time duration in which the shortened TTI is used, a plurality of resource blocks may be reserved to transmit a PUCCH by using the shortened TTI. More specifically, several UEs may not monitor a PDCCH in a region reserved to transmit the PUCCH by using the shortened TTI.

In another method, a time domain capable of transmitting a PUCCH (e.g., a periodic CSI feedback) consisting of resource blocks having at least a predetermined size may be aligned for each cell. Alternatively, a cell-specific subframe set or cell-specific symbol set capable of representing all periodic CSI reporting time points based on a periodic CSI configuration configured by a plurality of UEs in a cell may be configured, and information on the configured cell-specific subframe set or cell-specific symbol set may be transferred to the UE through higher layer signaling or the like. In this case, the information on the cell-specific subframe stet or cell-specific symbol set may be expressed in a form of a period and an offset or in a form of a group of a period and an offset. The UEs may perform rate-matching or puncturing on a potential location of a periodic CSI feedback configured in a cell specific manner. More specifically, when a resource block reserved for the periodic CSI feedback configured in a cell specific manner is configured or signaled, rate-matching or puncturing may be performed when the resource block reserved for the periodic CSI feedback and a resource block set to be used in PUSCH transmission overlap entirely or partially.

3. DMRS/UCI Transmission for Multi-TTI Size and/or Resource Block Size

When a multi-resource block is utilized in PUCCH transmission using a shortened TTI, a demodulation reference signal (DMRS) may be continuously mapped to all subcarriers of a resource block for transmitting a PUCCH in a specific symbol or may be discontinuously mapped to some subcarriers of the resource block for transmitting the PUCCH in the specific symbol.

Figure 9:
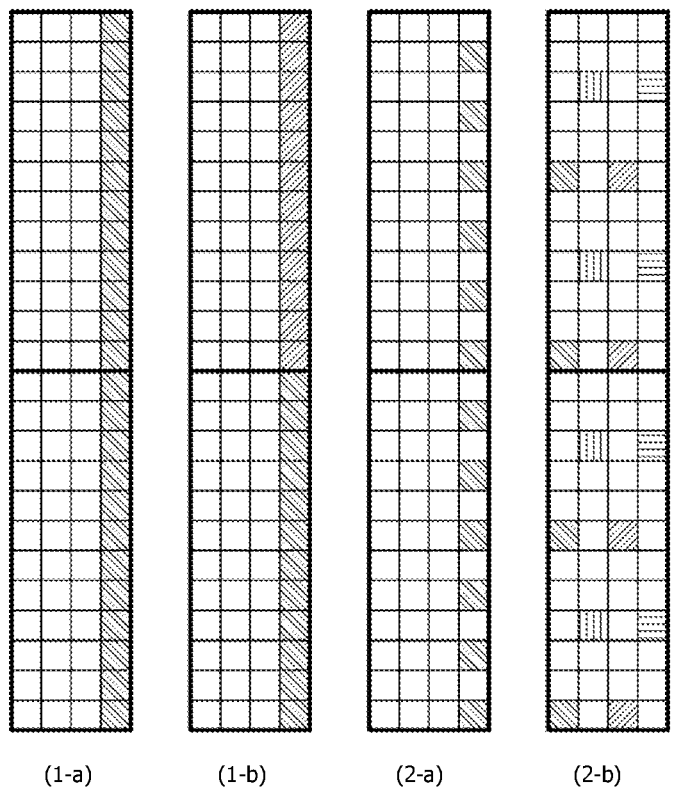
FIG. 9 shows an example of a DMRS configuration method according to a disclosure of the present specification.

FIG. 9 shows an example of a DMRS configuration method according to a disclosure of the present specification.

FIG. **9(1-*a*)** shows an example in which a sequence for a DMRS is generated on the basis of a length corresponding to the number of all subcarriers of a resource block for transmitting a PUCCH, and the generated sequence is mapped to a specific symbol. In this case, the DMRS between different PUCCH resource indices may be a value in which a root index and/or a cyclic shift of a sequence are set to a different value.

FIG. 9(1-*b*) shows an example in which a DMRS is continuously mapped to all subcarriers of a resource block for transmitting a PUCCH but a sequence is set differently for each resource block or for each resource block set. Accordingly, the resource block may support multiplexing between different PUCCHs or PUSCHs. More specifically, a plurality of DMRS sequences between resource blocks or resource block sets may be set such that a root index is identical and only a cyclic shift is different. In particular, the cyclic shift may be configured by considering a peak-to-average power ratio (PAPR). In this case, the DMRS between different PUCCH resource indices may be set with a different combination of a root index of a sequence set and/or a cyclic shift set.

FIGS. 9(2-*a*) and (2-*b*) show an example in which a DMRS sequence is mapped to a discontinuous resource element (RE) for a specific symbol. In this case, the DMRS between different PUCCH resource indices may be subjected to frequency division multiplexing (FDM) (i.e., configured to have a different DMRS frequency index) or code division multiplexing (CDM) with a combination of a root index and a cyclic shift (i.e., configured with a combination in which the root index and the cyclic shift are different values). More particularly, when the DMRS is subjected to CDM, a boundary and the number of resource blocks used for a PUCCH are identical. In addition, when the DMRS is subjected to FDM, a frequency difference between resource elements of the DMRS may be further increased to increase multiplexing capacity. For example, in case of FIG. 9(2-*a*), a frequency interval between resource elements of the DMRS may be 2, 3, 4, 6, etc.

The number of symbols and the number of resource blocks expressed above in FIG. 9 are only for one example, and it is obvious that the concept of the present specification can be extendedly applied even if other combinations and frequency hopping are performed.

Meanwhile, UCI (or a coded bit or symbol generated using the UCI) to be transmitted through a PUCCH may be mapped for all or some resource elements except for the DMRS. For example, the coded symbol for the UCI may be mapped in a frequency-first manner (i.e., mapping in an ascending order of a subcarrier index for each symbol) or in a time-first manner (i.e., mapping in an ascending order of a symbol index for each subcarrier). The mapping may be performed on all PUCCH resource blocks or may be performed in unit of a resource block set. In this case, to decrease a PAPR, discrete Fourier transform (DFT) may be performed on a data resource element for each symbol and then mapping may be performed on the resource element.

In addition, it may be considered to apply an orthogonal cover code (OCC) for a data domain. In this case, an OCC sequence is applied in a time domain, and UCI to be mapped between symbol sets to which the OCC sequence is applied or a coded symbol for the UCI may be identical. That is, if coded symbols a0, . . . , a11 for the UCI are subjected to DFT and thereafter are mapped to a first symbol by being multiplied by the OCC value, the symbols a0, . . . , a11 may also be subjected to DFT for the other symbols and thereafter be mapped by being multiplied by a next OCC value. Unlike this, an OCC sequence may be applied in a frequency domain, and UCI to be mapped between subcarrier sets to which the OCC sequence is applied or a coded symbol for the UCI may be identical. For example, an OCC sequence having a length of 2 in 12 subcarriers may be applied to a frequency axis. In this case, coded symbols a0, . . . , a5 for the UCI may be repeated according to OCC, and may be mapped to 12 subcarriers after being subjected to DFT in a form of w(0)a0, . . . , w(0)a(5), w(1)a(0), . . . , w(1)a(5).

Unlike this, a sequence may be preferentially mapped on a data resource element, and UCI or a coded symbol for the UCI may be mapped for each mapped sequence. For example, a sequence preferentially mapped to the data resource element may be a CAZAC sequence which is the same type as a DMRS.

For example, in case of the aforementioned FIG. 9(1-*a*), when considering a PUCCH using N resource blocks, a sequence generated based on a length of the N resource blocks is mapped to each of M symbols. In this case, a sequence of each symbol may have a different root index and/or cyclic shift. In addition, UCI or a coded symbol for the UCI may be transmitted by being included in each of the M sequences. In this case, the number of coded symbols or a size of the UCI to be transmitted may be limited to M.

For another example, in case of the aforementioned FIG. 9(1-*b*), N/N' sequences generated according to a length of N' resource blocks for each of M symbols may be mapped to each resource block set. That is, in case of a PUCCH using two resource blocks, two sequences based on a length of one resource block may be mapped to the respective resource blocks. In this manner, MN/N' sequences may exist for data mapping, and transmission may be performed by including UCI or a coded bit for the UCI with respect to each sequence.

In addition, it may be considered to apply an OCC for a data domain. In this case, the OCC may be applied for a combination of a time domain and/or a frequency domain. More specifically, in case of the aforementioned FIG. 9(1-*b*), the OCC may be applied across each sequence with a length of N/N'. Unlike this, the OCC with a length M may be applied to a symbol domain by considering a PAPR for a symbol.

Figure 10:
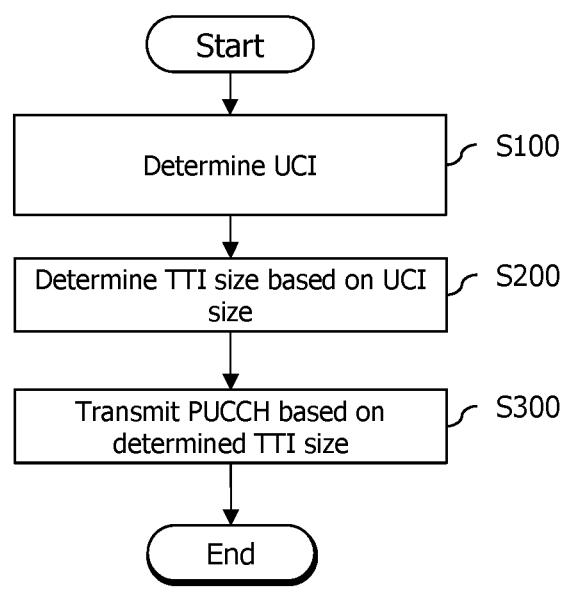
FIG. 10 is a flowchart showing an uplink control channel transmission method according to a disclosure of the present specification.

FIG. 10 is a flowchart showing an uplink control channel transmission method according to a disclosure of the present specification.

Referring to FIG. 10, a UE determines UCI to be transmitted to a BS (S100). If a plurality of pieces of UCI are to be transmitted to the BS, the UE may determine the plurality of pieces of UCI. For example, when two pieces of UCI are transmitted, the UE may determine first UCI and second UCI.

The UE determines a size of a TTI for transmitting a PUCCH on the basis of a size of the UCI (S200). Specifically, the UE may determine the size of the TTI for transmitting the PUCCH on the basis of a type of the UCI together with the size of the UCI. In addition, the UE may determine a size of a resource block for transmitting the PUCCH on the basis of the size of the UCI. In particular, the UE may receive information on a group indicating sizes of a plurality of TTIs through higher layer signaling, and may select a TTI size corresponding to the UCI size among the plurality of TTI sizes indicated by the received group.

Meanwhile, if the plurality of pieces of UCI are transmitted through a plurality of PUCCHs, the UE may determine a plurality of TTI sizes for a plurality of PUCCHs. For example, if the first UCI is transmitted through a first PUCCH and the second UCI is transmitted through a second PUCCH, a size of the first TTI for transmitting the first PUCCH may be determined based on a size of the first UCI, and a size of the second TTI for transmitting the second PUCCH may be determined based on a size of the second UCI.

Unlike this, when a plurality of pieces of UCI are transmitted through one PUCCH, the UE may determine sizes of a plurality of TTIs so that a TTI size can be flexibly changed in one PUCCH. For example, if the first UCI and third UCI are transmitted through the first PUCCH, the size of the first TTI is determined based on the size of the first UCI, and a size of the third TTI is determined based on the size of the third UCI. In addition, the UE may transmit the first UCI on the basis of the size of the first TTI, and may transmit the third UCI on the basis of the size of the third TTI.

In this case, if a location on a time domain of a resource for transmitting the first UCI and a location on a time domain of a resource for transmitting the third UCI are less than or equal to a predetermined interval, the third UCI may be transmitted on the basis of the size of the first TTI in order to increase efficiency of multiplexing and resource utilization. That is, the size of the third TTI may be determined to be equal to the size of the first TTI regardless of the size of the third UCI.

The UE transmits a PUCCH including UCI according to the determined TTI size (S300). If a plurality of pieces of UCI are transmitted through a plurality of PUCCHs, the UE may transmit a PUCCH including each piece of UCI according to a TTI size determined for each PUCCH. For example, if the size of the first TTI is determined for the first PUCCH and the size of the second TTI is determined for the second PUCCH, the first PUCCH including the first UCI may be transmitted on the basis of the size of the first TTI, and the second PUCCH including the second UCI may be transmitted on the basis of the size of the second TTI.

The aforementioned embodiments of the present invention can be implemented through various means. For example, the embodiments of the present invention can be implemented in hardware, firmware, software, combination of them, etc. Details thereof will be described with reference to the drawing.

Figure 11:
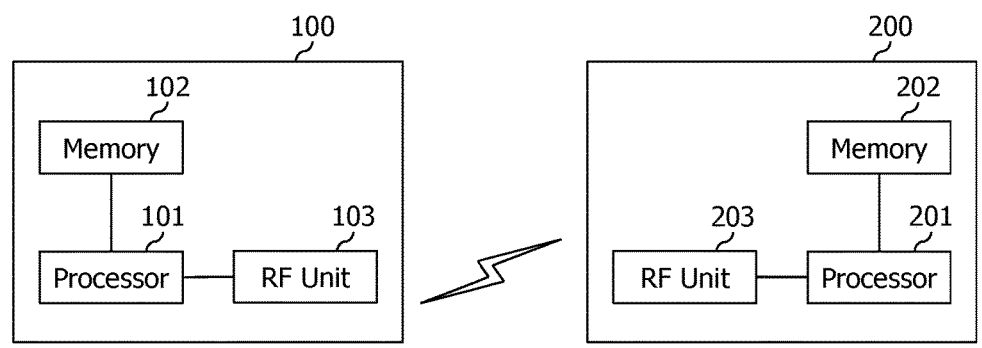
FIG. 11 is a block diagram illustrating a wireless communication system according to an embodiment of the present invention.

FIG. 11 is a block diagram illustrating a wireless communication system according to an embodiment of the present invention.

A base station 200 includes a processor 201, a memory 202, and a radio frequency (RF) unit 203. The memory 202 is connected to the processor 201 to store various information for driving the processor 201. The RF unit 203 is connected to the processor 201 to transmit and/receive a wireless signal. The processor 201 implements a suggested function, procedure, and/or method. An operation of the base station 200 according to the above embodiment may be implemented by the processor 201.

A wireless device 100 includes a processor 101, a memory 102, and an RF unit 103. The memory 102 is connected to the processor 101 to store various information for driving the processor 101. The RF unit 103 is connected to the processor 101 to transmit and/receive a wireless signal. The processor 101 implements a suggested function, procedure, and/or method. An operation of the wireless 100 according to the above embodiment may be implemented by the processor 101.

A processor may include an application-specific integrated circuit (ASIC), another chipset, a logic circuit, and/or a data processor. A memory may include read-only memory (ROM), random access memory (RAM), a flash memory, a memory card, a storage medium, and/or other storage devices. An RF unit may include a baseband circuit to process an RF signal. When the embodiment is implemented, the above scheme may be implemented by a module (procedure, function, and the like) to perform the above function. The module is stored in the memory and may be implemented by the processor. The memory may be located inside or outside the processor, and may be connected to the processor through various known means.

In the above exemplary system, although methods are described based on a flowchart including a series of steps or blocks, the present invention is limited to an order of the steps. Some steps may be generated in the order different from or simultaneously with the above other steps. Further, it is well known to those skilled in the art that the steps included in the flowchart are not exclusive but include other steps or one or more steps in the flowchart may be eliminated without exerting an influence on a scope of the present invention.

What is claimed is:

1. A method for transmitting a demodulation reference signal (DMRS) for a physical uplink control channel (PUCCH), the method performed by a user equipment (UE) and comprising:
   generating a sequence of the DMRS;
   mapping the sequence of the DMRS over resource elements (REs), wherein the REs over which the sequence of the DMRS is mapped are included in one or more resource blocks (RBs) of a slot used for the PUCCH, wherein the REs over which the sequence of the DMRS is mapped are non-continuous;
   mapping uplink control information (UCI) of the PUCCH over a plurality of REs other than the REs, over which the sequence of the DMRS is mapped; and
   transmitting, via the PUCCH, (i) the sequence of the DMRS mapped to the REs, and (ii) the UCI mapped to the plurality of REs other than the REs over which the sequence of the DMRS is mapped.

2. The method of claim 1, wherein the REs over which the sequence of the DMRS is mapped are distant from each other at equal intervals.

3. The method of claim 1,
   wherein the REs over which the sequence of the DMRS is mapped are offset from each other by 3.

4. The method of claim 1, wherein the sequence of the DMRS is mapped in unit of an orthogonal frequency division multiplexing (OFDM) symbol.

5. The method of claim 1, further comprising:
   generating the UCI.

6. The method of claim 1, wherein the UCI includes at least one of a hybrid Automatic Repeat Request (HARD) acknowledgement/negative acknowledgement (ACK/NACK).

7. The method of claim 1, wherein the UCI is mapped over the REs and OFDM symbols in increasing order of first RE indexes and then OFDM symbol indexes.

8. A user equipment (UE) for transmitting a demodulation reference signal (DMRS) for a physical uplink control channel (PUCCH), the UE comprising:
   a transceiver; and
   a processor configured to control the transceiver and configured to:
   generate a sequence of the DMRS,
   map the sequence of the DMRS over resource elements (REs), wherein the REs over which the sequence of the DMRS is mapped are included in one or more resource blocks (RBs) of a slot used for the PUCCH, wherein the REs over which the sequence of the DMRS is mapped are non-continuous,
   map uplink control information (UCI) of the PUCCH over a plurality of REs other than the REs, over which the sequence of the DMRS is mapped, and
   transmit, via the PUCCH, (i) the sequence of the DMRS mapped to the REs, and (ii) the UCI mapped to the plurality of REs other than the REs over which the sequence of the DMRS is mapped.

9. The UE of claim 8, wherein the REs over which the sequence of the DMRS is mapped are distant from each other at equal intervals.

10. The UE of claim 8,
wherein the REs over which the sequence of the DMRS is mapped are offset from each other by 3.

11. The UE of claim 8, wherein the sequence of the DMRS is mapped in unit of an orthogonal frequency division multiplexing (OFDM) symbol.

12. The UE of claim 8, wherein the processor is further configured to:
generate the UCI.

13. The UE of claim 8, wherein the UCI includes at least one of a hybrid Automatic Repeat Request (HARQ) acknowledgement/negative acknowledgement (ACK/NACK).

14. The UE of claim 8, wherein the UCI is mapped over the REs and OFDM symbols in increasing order of first RE indexes and then OFDM symbol indexes.

* * * * *